United States Patent [19]

Bugbee et al.

[11] Patent Number: 5,042,217

[45] Date of Patent: Aug. 27, 1991

[54] LIGHT WOOD TRUSS CONNECTION

[75] Inventors: Michael W. Bugbee, Hayward; Karen W. Colonias, Lafayette, both of Calif.

[73] Assignee: Simpson Strong-Tie Company, Inc., San Leandro, Calif.

[21] Appl. No.: 610,784

[22] Filed: Nov. 8, 1990

[51] Int. Cl.[5] .............................. E04B 1/38; E04C 3/02
[52] U.S. Cl. ................................... 52/643; 52/702; 403/170; 403/232.1
[58] Field of Search ................... 52/702, 713, 92, 90, 52/639, 648, 643; 403/170, 232.1; 182/185

[56] References Cited

U.S. PATENT DOCUMENTS

| | | | |
|---|---|---|---|
| 3,423,898 | 1/1969 | Tracy | 52/702 |
| 4,230,416 | 10/1980 | Gilb | 52/702 |
| 4,423,977 | 1/1984 | Gilb | 403/232.1 |
| 4,480,941 | 11/1984 | Gilb | 403/232.1 |
| 4,817,359 | 4/1989 | Colonias | 52/643 |
| 4,890,436 | 1/1990 | Colonias | 52/643 |
| 4,897,979 | 2/1990 | Colonias | 53/643 |
| 5,004,369 | 4/1991 | Young | 403/232.1 |

Primary Examiner—John E. Murtagh
Attorney, Agent, or Firm—James R. Cypher

[57] ABSTRACT

A light wood truss connection in which a hip truss and a jack truss are joined to a wood supporting girder by means of a sheet metal connector which includes first second and third side wall members and first and second back wall members. A single seat supports the hip truss while the jack truss is supported by fasteners only inserted through the third side wall member. Support for the jack truss is also by fasteners in double shear.

4 Claims, 5 Drawing Sheets

LIGHT WOOD TRUSS CONNECTION

BACKGROUND OF THE INVENTION

This invention relates to connectors which are used in the attachment of multiple wood trusses to a wood girder. The wood trusses intersect at an angle less than 90° and are used in constructing hip roofs in building structures, bracing or other multiple truss connections.

Prior connectors were constructed from heavy plates welded together on a custom basis by various fabricating iron shops. Traditional sheet metal connector fabricators have provided some of these custom made connectors but because welding is required and present solutions can not take advantage of high production methods, no cost effective way had been found of providing a standard connector for light wood trusses in the building industry.

SUMMARY OF THE INVENTION

The connector of the present invention is constructed from a single sheet metal member and is primarily designed to connect two wood trusses intersecting at a 45° or other angle less than 90° to a carrier girder in either a right or left configuration.

A secondary benefit is the fact that the identical connector may be used for connecting multiple light wood trusses which intersect at an angle other than a 90° angle.

An advantage of the present connector is that it requires no welding or painting.

A further advantage is that the connector of the present invention is significantly less expensive to make, uses less metal and installs easier than previous welded connectors.

Another advantage is that the present connector provides greater resistance to truss overturn than present single member connectors.

A still further advantage is the fact that the present connector is connected to the carrier girder or header at locations closer to the point of load thereby permitting less bending of the connector and resulting in less relative movement of the trusses at their connection to the carrier girder or header.

Still another advantage is the fact that the construction of the present connector permits easier nailing of the connector.

DESCRIPTION OF THE PREFERRED EMBODIMENT OF THE INVENTION

Figure 1:
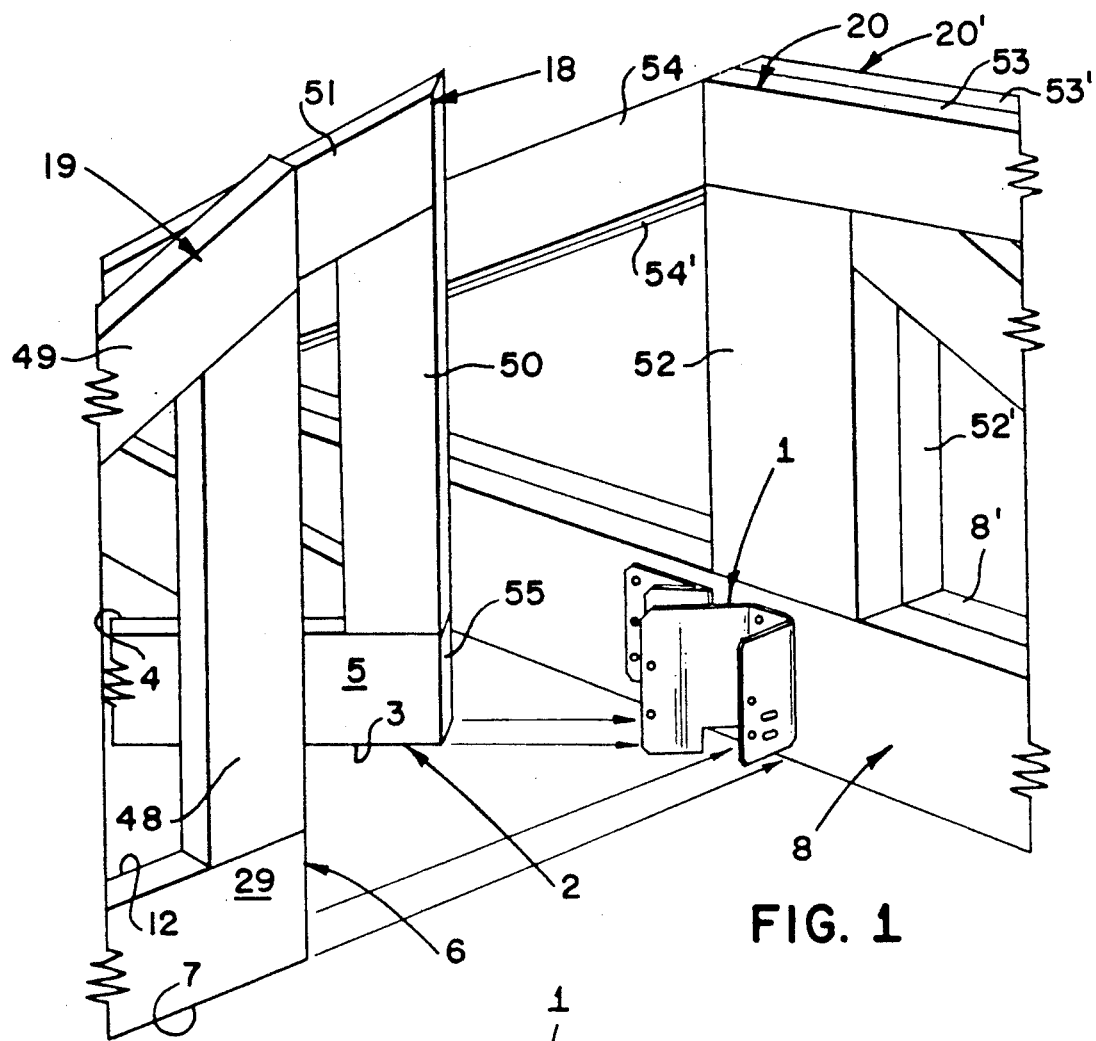
FIG. 1 is a perspective view of an exploded view of the connection of the present invention.
Figure 2:
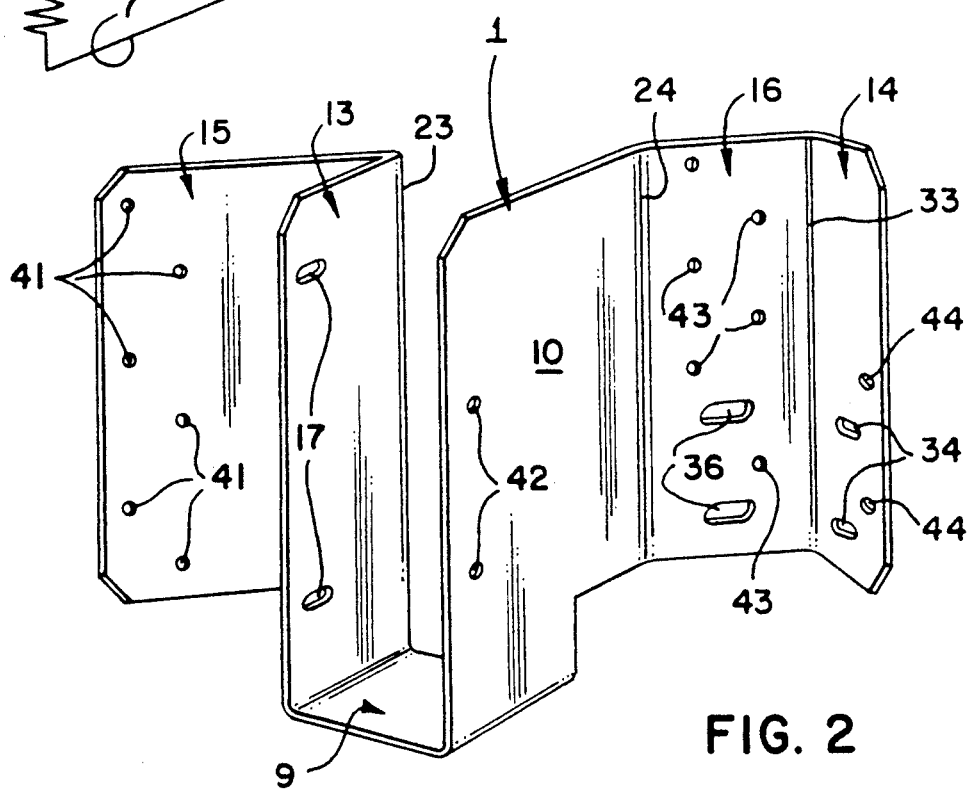
FIG. 2 is a perspective view of the connector used in the connection of the present invention.
Figure 3:
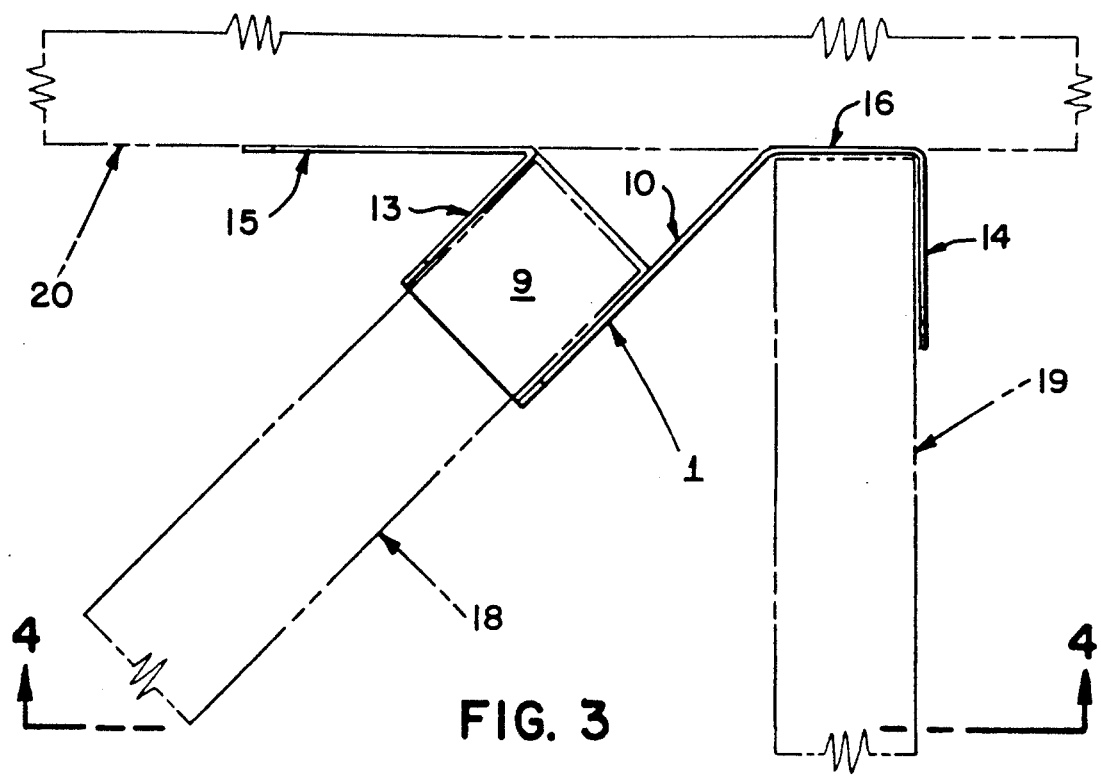
FIG. 3 is a top plan view of the connector illustrated in FIG. 2. The wood trusses in the connection are illustrated in broken line.
Figure 4:
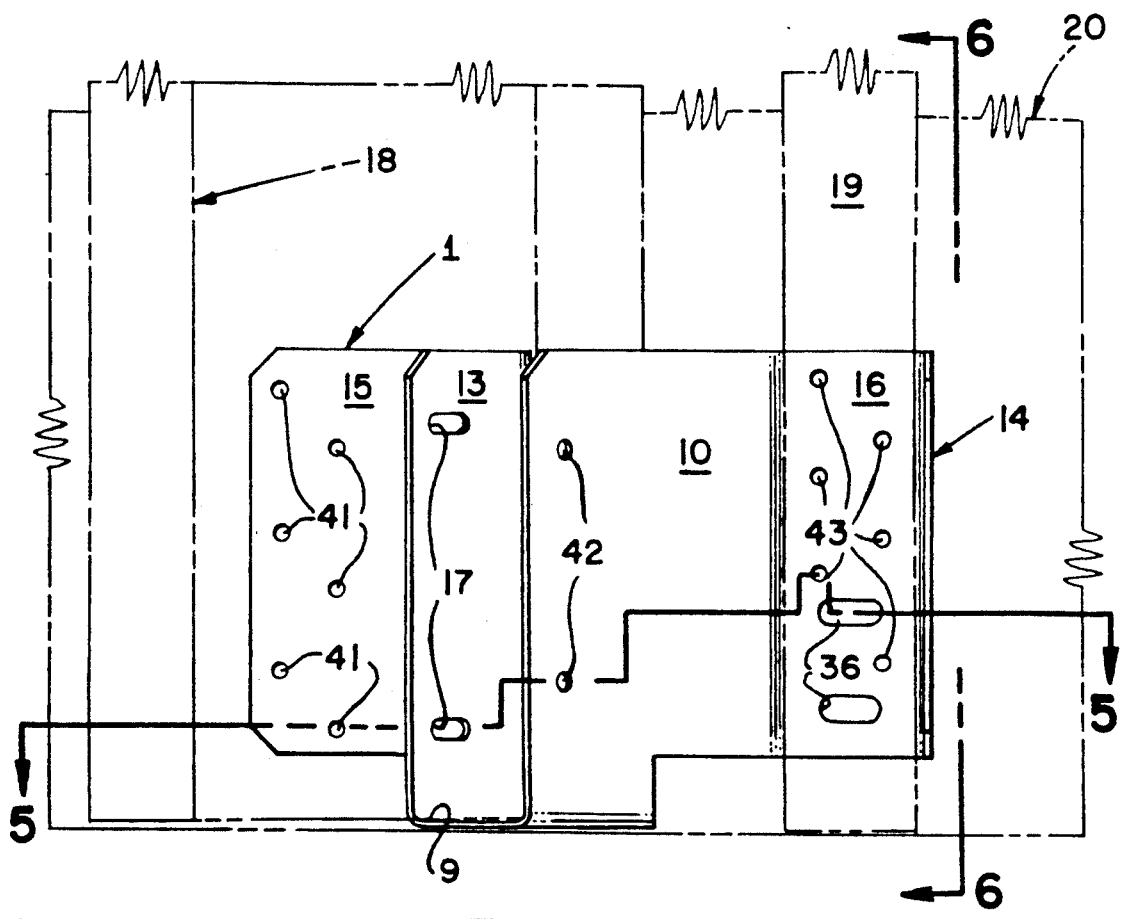
FIG. 4 is a front elevation view of the connector taken in the direction of lines 4—4 on FIG. 3. The wood trusses in the connection are illustrated in broken line.

The present invention is a multiple wood truss connection including a wood hip truss 18 including a wood bottom chord 2 having a bottom edge 3 and parallel first and second sides 4 and 5; a wood jack truss 19 including a wood bottom chord 6 having a bottom edge 7 and parallel first and second sides 12 and 29; a wood carrier girder 20 including a wood bottom chord 8 disposed at an angle of about 90° to the jack truss 19 and less than 90° to the hip truss 18; a sheet metal connector 1 including: a seat member 9 adapted for receiving the bottom edge 3 of the wood bottom chord 5 of the wood hip truss 18; a first side wall member 10 connected to the seat member 9 and extending angularly upwardly therefrom for registration with the second side 5 of the wood bottom chord 3 of the wood hip truss 18; a second side wall member 13 spaced from the first side wall member 10 and connected to the seat member 9 and extending upwardly therefrom parallel to the first side wall member 10 for registration with the first side 4 of the wood bottom chord 2 of the wood hip truss 18; a first back wall member 15 connected to the second side wall member 13 and extending at an angle thereto along a first bend line 23 and the first back wall member 15 is disposed for registration with the bottom chord 8 of the wood carrier girder 20; a second back wall member 16 connected to the first side wall member 10 and extending at an angle thereto along a second bend line 24 and providing vertical shear resistance along the second bend line 24 and the second back wall member 16 is disposed for registration with the bottom chord 8 of the wood girder 20 and in the same plane as the first back wall member 15; a third side wall member 14 connected to the second back wall member 16 along third bend line 33 for registration with the second side 29 of the wood bottom chord 6 of the wood jack truss 19; first slant fastener opening means 17 formed in the second side wall member 13; second slant fastener opening means 34 formed in the third side wall member 14; slotted openings 36 formed in second back wall member 16 in alignment with second slant fastener opening means 34 first slant fastener means 31 dimensioned for insertion through the first slant fastener opening means 17 for penetrating the wood bottom chord 2 of the wood hip truss 18; second slant fastener means 38 dimensioned for insertion through the second slant fastener opening means 34 in the third side wall member 14, and the slotted openings 36 in the second back wall member 16, and for insertion through the bottom chord 6 of the Jack truss 19 and into the bottom chord 8 of carrier girder 20 for connecting the third side wall member 14 to the bottom chord 6 and the bottom chord 8 of the carrier girder 20; and girder fastener means 46 connecting the first and second back wall members 15 and 16 to the bottom chord 8 of the wood carrier girder 20.

Figure 5:
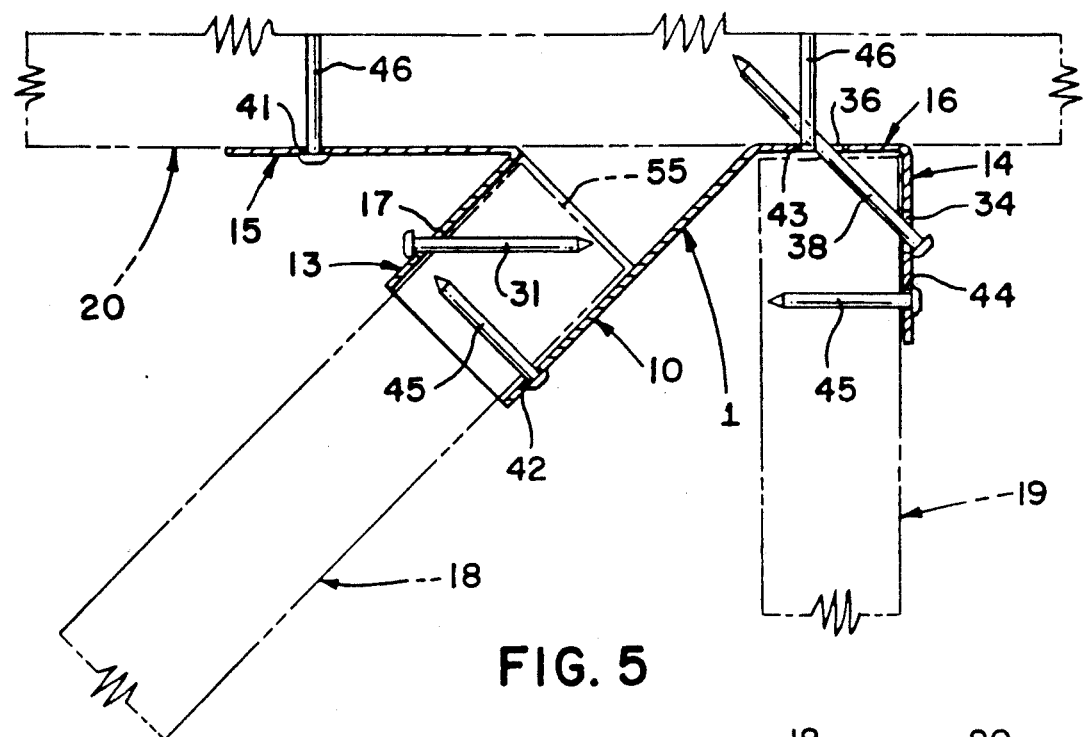
FIG. 5 sectional view of the connector illustrated in FIG. 2 taken along line 5—5 in FIG. 4. The wood trusses in the connection are shown in broken line. The connection illustrated in FIG. 5 may, for example, for be located as illustrated in the diagram of FIG. 8 in the vicinity line 5—5.
Figure 6:
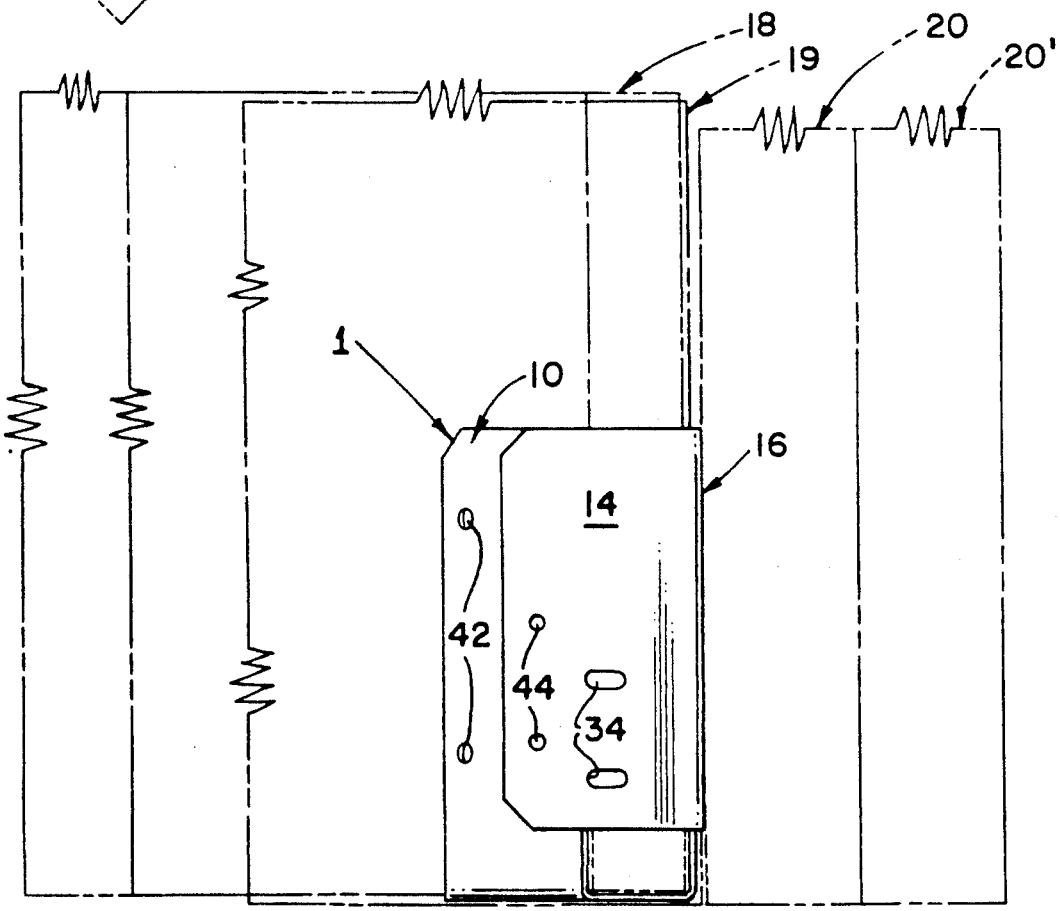
FIG. 6 is a side elevation view of the connector illustrated in FIG. 4 taken along 6—6. The wood trusses in the connection are shown in broken line.
Figure 7:
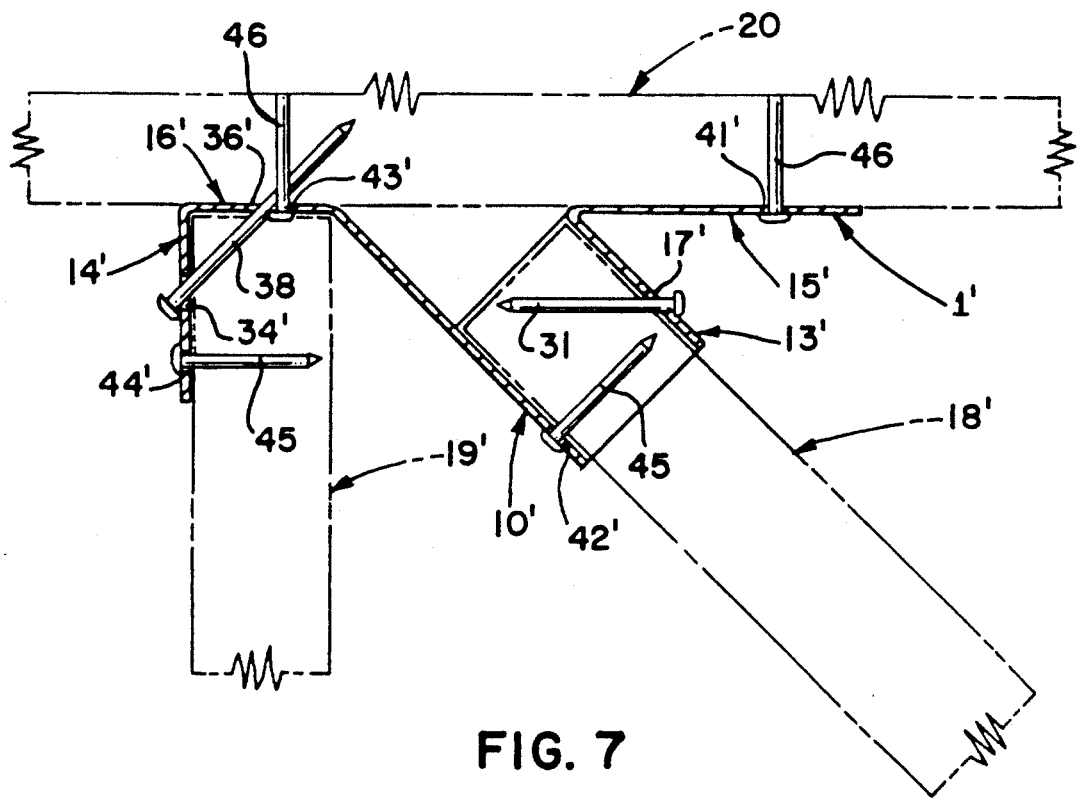
FIG. 7 is a sectional view of the reverse form of the connector illustrated in FIG. 2 taken along line 5—5 in FIG. 4. The wood trusses in the connection are shown in broken line. The connection illustrated in FIG. 7 is the reverse of the connector illustrated in FIG. 5 and may, for example, be located as illustrated in the diagram of FIG. 8 in the vicinity of line 7—7.
Figure 8:
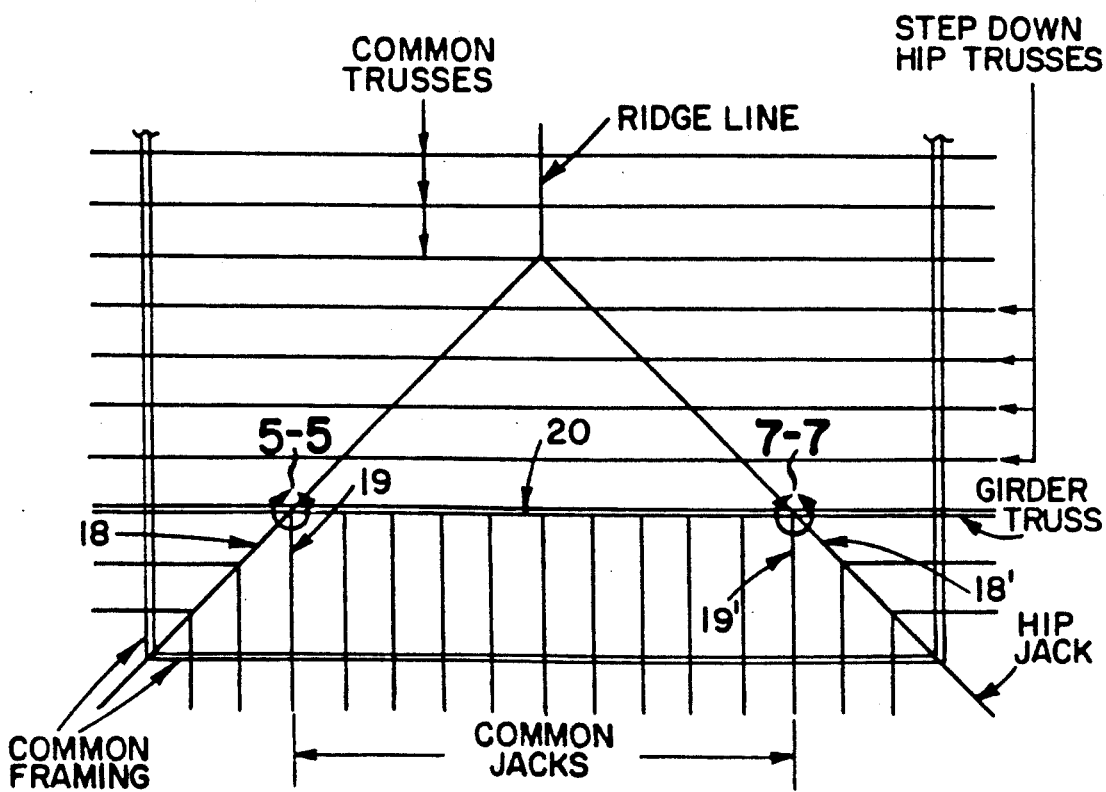
FIG. 8 is a diagram of a roof system illustrating the structure in which the connection of the present invention may be used.

A key feature of the invention is that the construction of the connector 1 is such that by bending each member along the bend lines a direction 180° in the opposite direction, the connector can be changed to skew right as illustrated in FIG. 7 or left as illustrated in FIG. 5.

As set forth above, first slant fastener opening means 17 are formed in second side wall member 13. Preferably these openings are slots, but they may be deformations in the second side wall member 13 which permit a nail or screw to be driven at an angle to the plane of the second side wall member 13. As shown in the drawings, because first back wall member 15 and second side wall members 13 form an acute angle, there is very little room to swing a hammer to drive a nail 31 into bottom chord 2.

Second slant fastener opening means 34 may also be obround openings but the shape of these openings are for an entirely different purpose than first slant fastener opening means 17. The second slant fastener opening means 34 are designed to receive second slant fastener means 38 such as nails or screws at an angle to the plane of third side wall member 14 so that the fastener may be driven through bottom chord 6 of jack truss 19, through slotted openings 36 and into bottom chord 8 of carrier girder 20. Driving second slant fastener means 38 through the openings in the connector and into the bottom chord 8 places the second slant fastener means 38 in double shear thereby providing greatly increased holding power. The amazing increase in fastener holding power through double shear is discussed in U.S. Pat. No. 4,480,941 granted Nov. 6, 1984.

To facilitate the installation of the connection, preferably the connector is formed so that first back wall member 15 is formed with fastener openings 41 therethrough; first side wall member 10 is formed with fastener openings 42 therethrough; second back wall member 16 is formed with fastener openings 43 therethrough; third side wall member 14 is formed with fastener openings 44 therethrough; girder fastener means 46 are dimensioned for insertion through the fastener openings 41 in the first back wall member 15 and fastener openings 43 in the second back wall member 16; and truss fastener means 45 are dimensioned for insertion through the fastener openings in the first side wall member 10 and the third side wall member 14. Fasteners 45 may be either nails or screws dimensioned so that they do not extend completely through the wood member.

As an example, the sheet metal connector 1 of the present invention may be constructed from 18 gauge galvanized steel. Twelve 10d nails 46 may be driven through fastener openings 41 and 43 into bottom chord 8 of carrier girder 20; four 10d×1½" fastener nails 31 may be driven through first slant fastener opening means 17 into bottom chord 2 of wood hip truss 18; and two 10d nail fasteners 45 may be driven through fastener openings 44 in third side wall member 14 into bottom chord 6 of jack truss 19 and 2 10d×1½" nail fasteners may be driven through second slant fastener opening means 34, through bottom chord 6, through slotted openings 36 and into bottom chord 8 of carrier girder 20.

A double girder 20' should be provided to allow for code-required nail penetration, and all multiple members should be fastened together to act as a single unit.

Allowable loads by code based on Southern Pine and the lowest of the following: the test ultimate divided by three, the load producing a ⅛" deflection, the shear nail values and the seat bearing value at 565 psi plus the allowable joist nail rating are as follows: 1). uplift including a 33% increase for wind or earthquake loading with no further increase allowed is 575 pounds for the wood hip truss 18; and 250 pounds for jack truss 19; 2). floor load for the wood hip truss 18 is 1170 pounds and for the jack truss 19 395 pounds; and roof allowable loads are 1465 pounds for the wood hip truss 18 and 490 pounds for the jack truss 19.

Details of the construction of the trusses and girders is immaterial to this invention but may be as follows. In jack truss 19, a vertical member 48 is joined to bottom chord 6 and top chord 49 by suitable means such as prong plates (not shown). In wood hip truss 18, vertical wood member 50 is joined to bottom chord 3 and top chord 51 by suitable means such as prong plates (not shown). Carrier girders 20 and 20' may be constructed with vertical members 52 and 52' joining bottom chords 8 and 8" and top chords 53 and 53'. A slanting top chord 54 and 54' may be joined to the end of top chords 53 and 53' by suitable fastening means such as prong plates (not shown).

In constructing a left skewed connector as illustrated in FIG. 5, the blank member illustrated in FIG. 9 should be folded as follows. First back wall member 15 should be bent upwardly 135° with respect to second side wall member 13 along bend line 23. Second side wall member 13 should be bent down 90° with respect to seat 9. First side wall 10 should be bend down 90° with respect to seat 9. First side wall member 10 should be bent up 45° with respect to second back wall member 16. Finally, third side wall 14 may be bend up 90° with respect to second back wall member 16.

Figure 9:
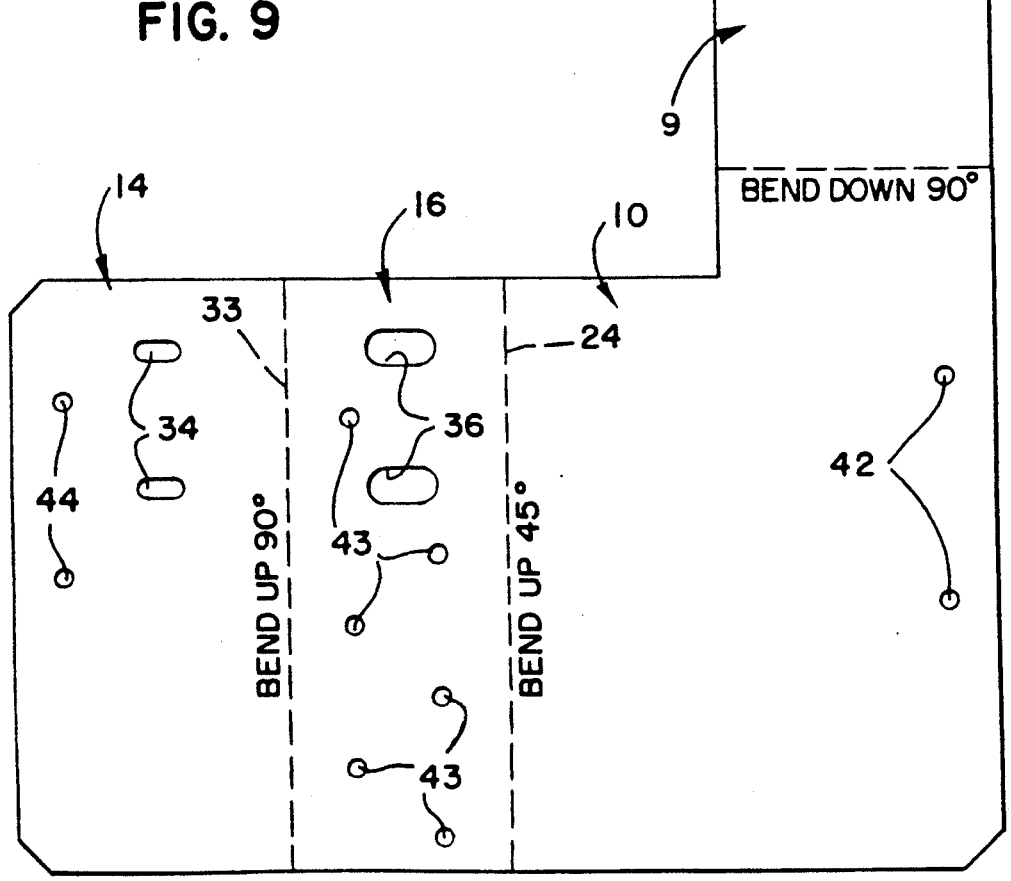
FIG. 9 is a plan view of the blank of the connector illustrated in FIG. 2 prior to bending.

To construct a right skewed connector as illustrated in FIG. 7, the blank member illustrated in FIG. 9 should be bent along the same bend lines the same number of degrees in just be opposite directions. Like parts of connector 1 are identical to connector 1' illustrated in FIG. 7 and the description has not been repeated. Like parts, however, are designated by a prime mark (') after the identical number.

An advantage of the use of the connector 1 used in the connection of the present invention is the fact that the end 55 of the wood hip truss 18 may be a right angle and need not be sawn to conform to the skew angle.

We claim:

1. A multiple wood truss connection comprising:
   a. a wood hip truss including a wood bottom chord having a bottom edge and parallel first and second sides;
   b. a wood jack truss including a wood bottom chord having a bottom edge and parallel first and second sides;
   c. a wood carrier girder including a wood bottom chord disposed at an angle of about 90° to said jack truss and less than 90° to said hip truss;
   d. a sheet metal connector including:
      1. a seat member adapted for receiving said bottom edge of said wood bottom chord of said wood hip truss;
      2. a first side wall member connected to said seat member and extending angularly upwardly therefrom for registration with said second side of said wood bottom chord of said wood hip truss;
3. a second side wall member spaced from said first side wall member and connected to said seat member and extending upwardly therefrom parallel to said first side member for registration with said first side of said wood bottom chord of said wood hip truss;
4. a first back wall member connected to said second side wall member and extending at an angle thereto along a first bend line and said first back wall member is disposed for registration with said bottom chord of said wood carrier girder;
5. a second back wall member connected to said first side wall member and extending at an angle thereto along a second bend line and providing vertical shear resistance along said second bend line and said second back wall member is disposed for registration with said bottom chord of said wood girder and in the same plane as said first back wall member;
6. a third side wall member connected to said second back wall member along third bend line for registration with said second side of said wood bottom chord of said wood jack truss;
7. first slant fastener opening means formed in said second side wall member;
8. second slant fastener opening means formed in said third side wall member;
9. slotted openings formed in second back wall member in alignment with second slant fastener opening means;
10. first slant fastener means dimensioned for insertion through said first slant fastener opening means for penetrating said wood bottom chord of said wood hip truss;
11. second slant fastener means dimensioned for insertion through said second slant fastener opening means in said third side wall member, and said slotted openings in said second back wall member, through said bottom chord of said jack truss and into said bottom chord of carrier girder for connecting said third side wall member to said bottom chord and said bottom chord of said carrier girder; and
12. girder fastener means connecting said first and second back wall members to said bottom chord of said wood carrier girder.

2. A connection as described in claim 1 wherein:
a. the construction of the connector is such that by bending each member along said bend lines a direction 180° in the opposite direction, the connector can be changed to skew right or left.

3. A connection as described in claim 1 wherein:
a. said first and second slant fastener opening means are slotted openings.

4. A connection as described in claim 2 comprising:
a. said first back wall member is formed with fastener openings therethrough;
b. said first side wall member is formed with fastener openings therethrough;
c. said second back wall member is formed with fastener openings therethrough;
d. said third side wall member is formed with fastener openings therethrough;
e. said girder fastener means are dimensioned for insertion through said fastener openings in said first back wall member, and said second back wall member; and
f. truss fastener means dimensioned for insertion through said fastener openings in said first side wall member and said third side wall member.

* * * * *